(12) United States Patent
Clerc

(10) Patent No.: US 7,703,915 B2
(45) Date of Patent: Apr. 27, 2010

(54) LENS BLANK, AND A METHOD AND A MOLD FOR FABRICATING IT

(75) Inventor: Didier Clerc, Eloise (FR)

(73) Assignee: BNL Eurolens, Bellegarde-sur-Valserine (FR)

( * ) Notice: Subject to any disclaimer, the term of this patent is extended or adjusted under 35 U.S.C. 154(b) by 534 days.

(21) Appl. No.: 11/598,580

(22) Filed: Nov. 14, 2006

(65) Prior Publication Data

US 2007/0109493 A1    May 17, 2007

(30) Foreign Application Priority Data

Nov. 15, 2005  (FR) .................................. 05 11550

(51) Int. Cl.
G02C 7/02 (2006.01)
G02C 7/04 (2006.01)

(52) U.S. Cl. ....................... 351/159; 351/165; 351/177; 264/328.8

(58) Field of Classification Search ......... 351/159–178; 264/1.32, 1.34, 328.8, 328.1; 425/556

See application file for complete search history.

(56) References Cited

U.S. PATENT DOCUMENTS

| 5,805,263 | A | * | 9/1998 | Reymondet et al. ......... 351/159 |
| 6,074,196 | A | | 6/2000 | Shimizu et al. |
| 6,165,392 | A | * | 12/2000 | Kobuchi et al. ............... 264/1.7 |
| 6,554,421 | B1 | * | 4/2003 | Billard et al. .................. 351/41 |
| 2002/0176172 | A1 | | 11/2002 | Nemoto et al. |
| 2004/0075182 | A1 | * | 4/2004 | Gobron ........................ 264/2.5 |
| 2004/0096539 | A1 | * | 5/2004 | McCaffrey et al. ........... 425/547 |

* cited by examiner

*Primary Examiner*—Kat Wyrozebski
*Assistant Examiner*—Scott W Dodds
(74) *Attorney, Agent, or Firm*—Young & Thompson

(57) ABSTRACT

A lens blank having a base prefitted with an insert and peripheral ejector marks on the base provided outside an outermost portion of the insert. The ejector marks are carried by a tab of the base having extra thickness on the same side as the insert, and a recess in its other side, the recess forming an element for centering the spacer of an adjacent blank, which is superposed thereon.

7 Claims, 2 Drawing Sheets

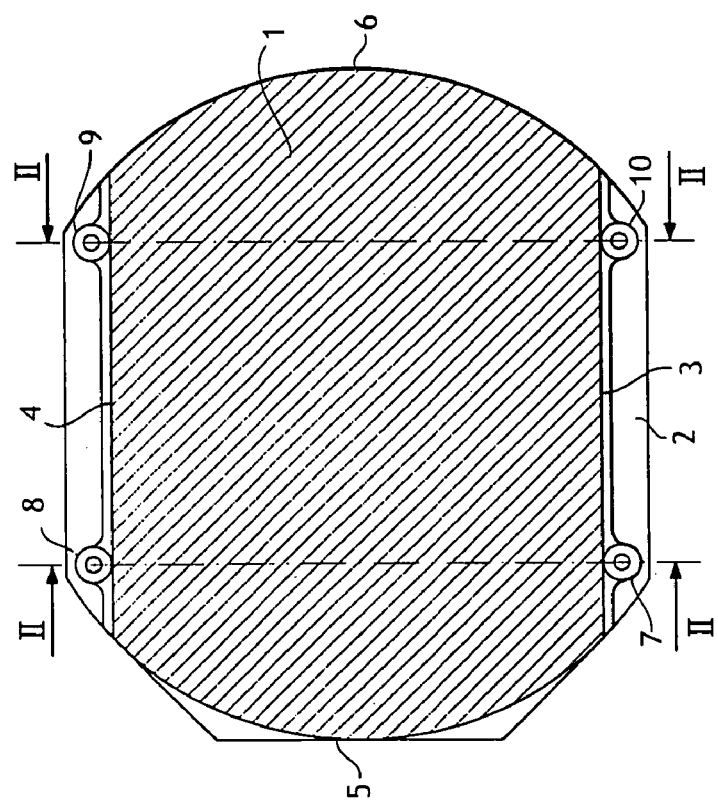
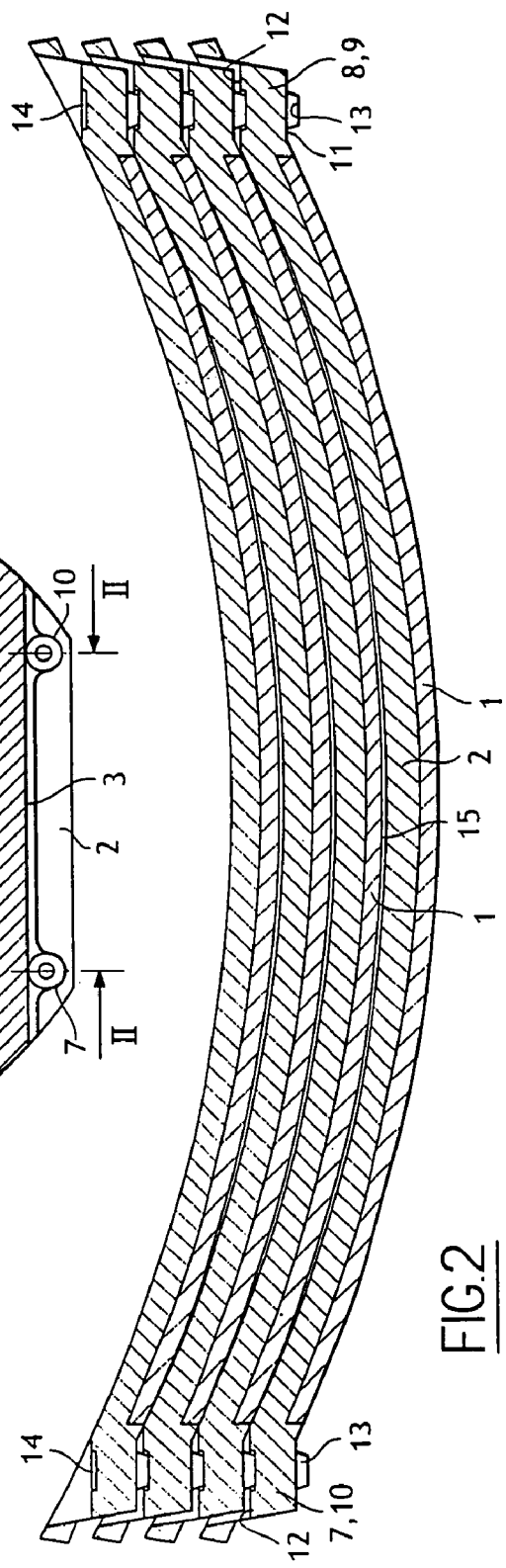
FIG.1
FIG.2

LENS BLANK, AND A METHOD AND A MOLD FOR FABRICATING IT

The present invention relates to a lens blank fabricated by injecting a thermoplastic material into a mold that is prefitted with an insert (generally a sheet of polarizing or photochromic or colored material that has been cut to shape and preformed). The invention also relates to a method of fabricating such a blank.

BACKGROUND OF THE INVENTION

This type of component is known. It is used in particular for fabricating correcting lenses for ophthalmic eyeglasses or comfort lenses (for sunglasses, protective glasses, . . . ).

Several fabrication techniques are known for this kind of component. By way of example, one of them is illustrated by patent document US 2004/0217495. In that document, a mold is used comprising two parts that open relative to each other, one of the parts defining a complex cavity in which a kind of spot face is provided for containing an insert in sheet form, such as a portion of polarized film, the spot face being defined by a plurality of mold portions that are adjustable relative to one another.

The mold as disclosed therein would appear to consume a large quantity of injected material, much of which will constitute scrap when making a lens from the molded blank.

In addition, the blank from that mold is not suitable for automatic handling, nor even for building up stacks since the surface presenting the polarized film projects from the blank as a whole, and is thus exposed to external aggression that might scratch the film.

Industrializing the method disclosed in that document would appear to require equipment that is complicated, demanding incessant and accurate adjustments, thereby unfavorably influencing the cost price of the fabricated blank.

OBJECT OF THE INVENTION

The present invention proposes a novel design for such a lens blank that makes it possible to implement a fabrication method that is much more simple and that serves to produce a component that is competitively priced.

SUMMARY OF THE INVENTION

To this end, in a first aspect, the invention provides a lens blank coming from a mold having a sheet insert placed therein prior to injection, the blank including peripheral ejector marks, said marks lying outside the insert. This characteristic is the signature of the invention. As explained below, no portion of the insert, which is an expensive ingredient, is used for those portions of a blank that are designed to be destroyed while fabricating a lens for eyeglasses or for an eyepiece.

In preferred manner, each mark is carried by a tab having extra thickness on the same side as the insert, and a recess in its other side, the recess forming an element for centering the spacer of an adjacent blank, which is superposed thereon. By means of these tabs, it is possible to stack the blanks on one another without the surface of an insert coming into contact with the blanks immediately below it in the stack, said surface then being protected from the external environment.

In a second aspect, the invention provides a method of fabricating the above-specified blank by injection molding, using a mold that opens into two parts, one of the parts being provided with ejectors that are movable perpendicularly to the closure plane of the mold, which method consists, starting from the open mold, in:

placing the ejectors in the ejection position;
engaging the sheet insert between the ejectors and retaining it between them by elastic wedging;
closing the mold while retracting the ejectors into the corresponding part;
injecting a thermoplastic material into the mold;
opening the mold after the thermoplastic material has hardened;
placing the ejectors back in the ejection position; and
extracting the composite blank as obtained in this way.

Naturally, in fabrication tooling, the opening mold will have a plurality of cavities, each being provided with at least three ejectors so as to be able to hold the insert stationary within each of the cavities by wedging.

Other characteristics and advantages of the invention appear from the description given below of an embodiment thereof.

BRIEF DESCRIPTION OF THE DRAWINGS

Reference is made to the accompanying drawings, in which:

FIG. 1 is a diagrammatic plan view of a lens blank in accordance with the invention;

FIG. 2 is a section on one or other of the lines II-II of FIG. 1, through a stack of blanks in accordance with the invention.

DETAILED DESCRIPTION OF THE INVENTION

Figure 3:
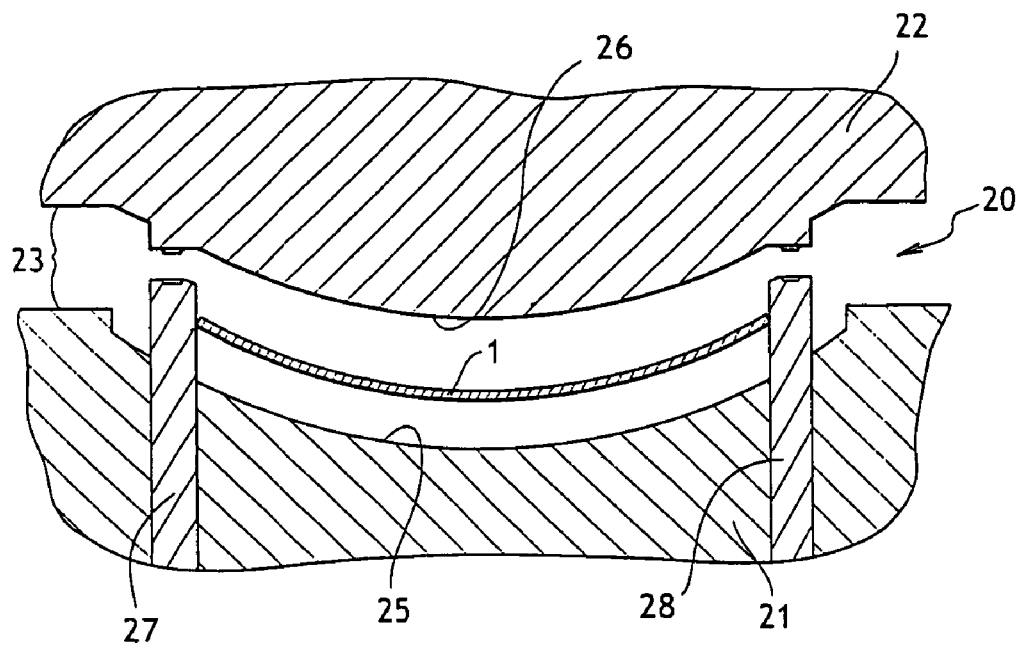
FIGS. 3, 4, and 5 show three stages in the method of making such blanks.

With reference to FIGS. 1 and 2, it can be seen that a lens blank in accordance with the invention is composite, comprising a film 1 of polarizing material and a base 2 of transparent resin that may optionally be colored, or possibly even include photochromic pigments.

The film 1 is cut out so as to present two rectilinear edges 3 and 4 and two curved end edges 5 and 6. Outside the edges 3 and 4, the blank has ejection marks 7, 8, 9, and 10 where the ejectors have acted to extract the blank from the cavity of the fabrication mold, as explained in detail below.

In the particular example shown in the figures, these ejection marks are in fact cylindrical tabs defined by a bottom surface 11 and a top surface 12 parallel thereto, with the bottom surface 11 being provided with extra thickness 13, while the top surface 12 presents a recess 14. The distance between the bottom of the recess 14 and the top of the extra thickness 13 is such that when two blanks are superposed, as shown in FIG. 2, there remains clearance 15 between the polarizing film 1 of an upper blank and the base 2 of the lower blank on which the upper blank is placed. The extra thickness 13 thus constitutes a spacer that penetrates into the inside of the recess 14 and that also constitutes means for centering two superposed blanks relative to each other.

Figure 4:
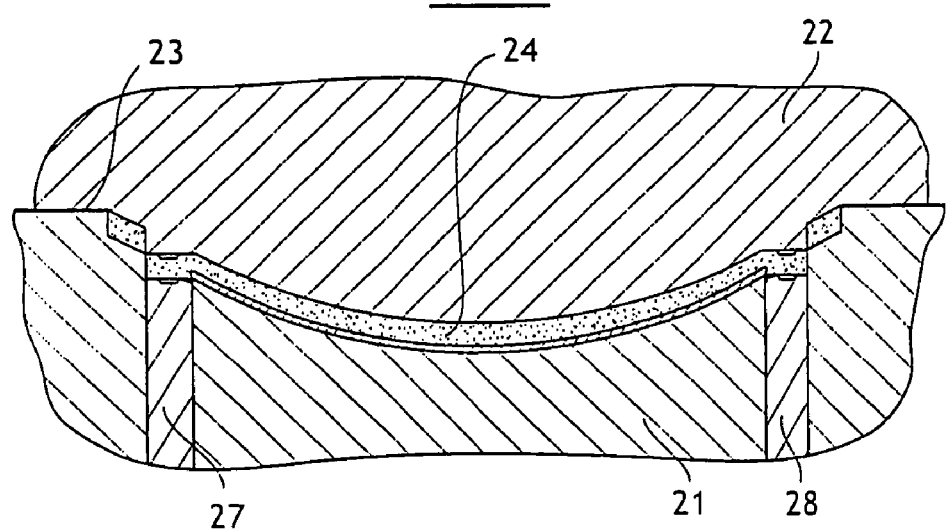
Figure 5:
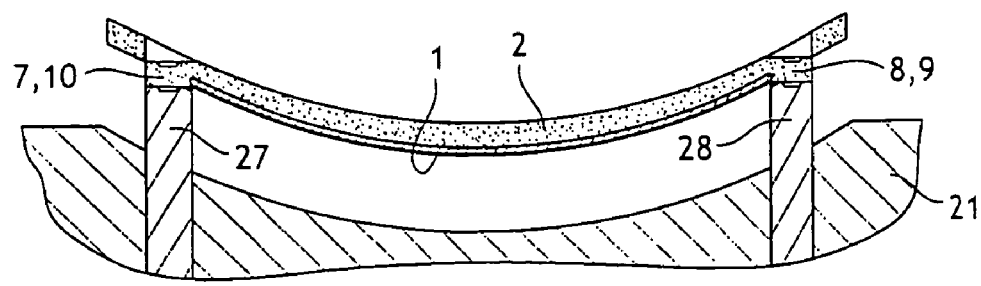

The mold 20 for making the blank of the invention is shown diagrammatically in FIGS. 3, 4, and 5, comprising two parts 21 and 21 that are movable relative to each other between an open position as shown in FIG. 3 and a closed position as shown in FIG. 4. When the mold is closed, it defines a join plane 23 and a cavity 24.

The bottom part 21 presents a bottom surface 25 of the cavity that is generally concave, while the top part 22 presents a top cavity surface 26 that is generally concave. The bottom part 21 is provided with four ejectors passing through the bottom surface 25. Two of the ejectors 27 and 28 are shown in the figures.

The method of the invention consists initially in moving the part 22 away, while the mold is open, so as to provide free access to the cavity in the bottom part 21. The ejectors 27 and 28 are in their positions where they project above the surface 25 so as to constitute pillars between which it is possible to place a polarizing film 1 that has already been preshaped to have a surface that is substantially identical to one or other of the surfaces 25 or 26, but of transverse dimension, i.e. the distance at rest between the longitudinal edges 3 and 4 of the polarizing film 1, that is slightly greater than the distance between two ejectors such as 27 and 28. It will thus be understood that prior to coming into contact with the surface 25, the polarizing film can be held stationary by being wedged elastically (braced) between the ejectors. Three ejectors could suffice.

With the film 1 put into place in this way, using any suitable robotic arm or mechanism, the mold is closed by bringing the mold part 22 over the part 21 and by causing their surfaces 23 to coincide so as to constitute the join plane of the mold. Simultaneously, the ejectors 27, 28 are retracted below the surface 25 as shown in FIG. 4. It can be seen that the top surfaces of the ejectors 27, 28 possess setbacks, while the bottom surface 26 of the top part 22 of the mold presents a substantially circular portion facing each ejector and presenting a projection. The cavity 24 is thus shaped in such a manner that in register with the ejectors 27, 28 it is possible to obtain the shapes of the tabs 7, 8, 9, and 10 as described above.

Thereafter the thermoplastic material for constituting the base 2 of the blank is injected. This injection takes place substantially parallel to the join plane 23 and in a direction perpendicular to the plane of FIGS. 3 to 5, i.e. in the longitudinal direction of the insert 1. The shape of the cavity 24 is such that the curvilinear edges 5 and 6 of the insert fit closely to the corresponding edges of the cavity 24. In the example shown, the cavity 24 has a curvilinear edge identical to the edge 6 and a rectilinear edge tangential to the edge 5. Under such conditions, the injected stream of thermoplastic material leads to practically no variation in the position of the insert 1 even though the ejectors 27 and 28 are retracted.

Once the material has hardened, the mold is opened and the ejectors 27 and 28 are extended, as shown in FIG. 5. It is then possible to take charge of the blank of the invention by any appropriate robotic means.

It will be understood that the design of the lens blank of the invention and its method of fabrication make it possible to simplify the shape of the mold cavity and thus the design of the mold, to save on polarizing material by ensuring that this material does not extend over the ejectors, but without that requiring films of polarizing material to be cut out in a complex manner, and finally, the invention makes it easier to store blanks made by the fabrication method of the invention, in particular by protecting the sensitive outside face of the polarizing film 1 from any aggression from the environment.

What is claimed is:

1. An injected plastic composite lens blank, comprising:
    a base with a face on a first side, an opposite second side, and a periphery,
    wherein the base has an insert sheet on the face of the base, and peripheral ejector marks extending from the periphery of the base, each of the ejector marks having a first surface and a second surface opposite and parallel to the first surface,
    wherein an outermost peripheral edge of the insert sheet is adjacent to and in contact with said ejector marks,
    wherein the ejector marks of the base comprise cylindrical tabs,
    wherein the second side of the base has a recess at each of the tabs of the ejector marks,
    wherein the first side of the base has an extra thickness at each of the tabs of the ejector marks, the extra thicknesses forming spacers, and
    wherein the recesses are configured to receive and center the spacers of an adjacent lens blank.

2. The lens blank according to claim 1, wherein the ejector marks each have an inward facing surface, and the outermost peripheral edge of the insert sheet is adjacent to and in contact with said inward facing surfaces.

3. A method of fabricating a blank according to claim 1 by injection molding, using a mold that opens in two parts, the two parts defining between them at least one cavity, one of the parts being provided with a plurality of ejectors movable perpendicularly to the closure plane of the mold, the method consisting, starting from the open mold, in:
    placing the ejectors in the ejection position;
    engaging the sheet insert between the ejectors and retaining it between them by elastic wedging;
    closing the mold while retracting the ejectors into the corresponding part;
    injecting a thermoplastic material into the mold;
    opening the mold after the thermoplastic material has hardened;
    placing the ejectors back in the ejection position; and
    extracting the composite blank as obtained in this way.

4. An injected plastic composite lens blank, comprising:
    a base, having ejector marks at a periphery of the base, the ejector marks each having a top surface and a bottom surface opposite and parallel to the top surface; and
    an insert sheet on a surface of the base, having two rectilinear edges and two curved end edges,
    wherein outermost portions of the two rectilinear edges abut against inward-facing surfaces of the ejector marks of the base,
    wherein the ejector marks comprise cylindrical tabs,
    wherein the bottom surfaces of the ejector marks, at each of the cylindrical tabs, are each provided with an extra thickness, and
    wherein the top surfaces of the ejector marks, at each of the cylindrical tabs, each have a recess.

5. The lens blank according to claim 4,
    wherein the extra thickness of each tab constitutes a spacer configured to penetrate into a recess of a tab of another lens blank,
    wherein a thickness of the cylindrical tabs, defined by a distance between a bottommost portion of the recess and the topmost portion of the extra thickness, is configured to maintain a clearance between a surface of the insert sheet and a surface of a base of said another lens blank, and
    wherein the cylindrical tabs are configured to center the lens blank atop said another lens blank.

6. A stack of injected plastic composite lens blanks, comprising:
    a first lens blank; and
    a second lens blank atop said first lens blank,
    wherein said first and second lens blanks each comprise a base and an insert sheet on a surface of the base, the base having a face on a first side, an opposite second side, and a periphery, the base also having peripheral ejector marks at the periphery of the base, the ejector marks having a first surface and a second surface opposite and parallel to the first surface,
wherein the ejector marks of the base comprise cylindrical tabs extending from the periphery of the base,
wherein an outermost peripheral edge of the insert sheet is in abutment with the tabs, and the tabs each have a first side, an opposite second side, an extra thickness on the first side, and a recess in the second side, and
wherein the recesses of the first lens blank are configured to receive the extra thicknesses of the second lens blank such that the base of the first lens blank does not come into contact with the insert sheet of the second lens blank.

7. The stack of injected plastic composite lens blanks according to claim 6, wherein the recesses of the first lens blank and the extra thicknesses of the second lens blank are configured such that a center of the first lens blank coincides with a center of the second lens blank.

* * * * *